Figure 3:
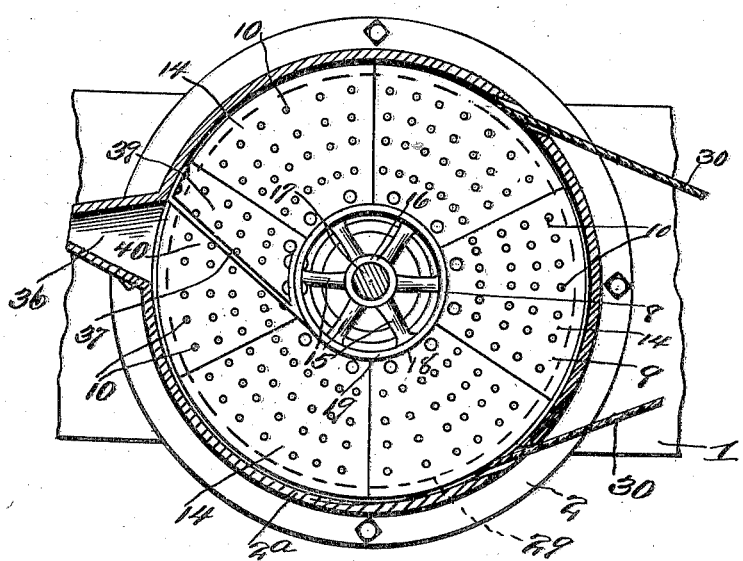

W. H. NOLAND.
MACHINE FOR TREATING FRUIT.
APPLICATION FILED NOV. 1, 1909.
950,753.
Patented Mar. 1, 1910.
2 SHEETS—SHEET 1.
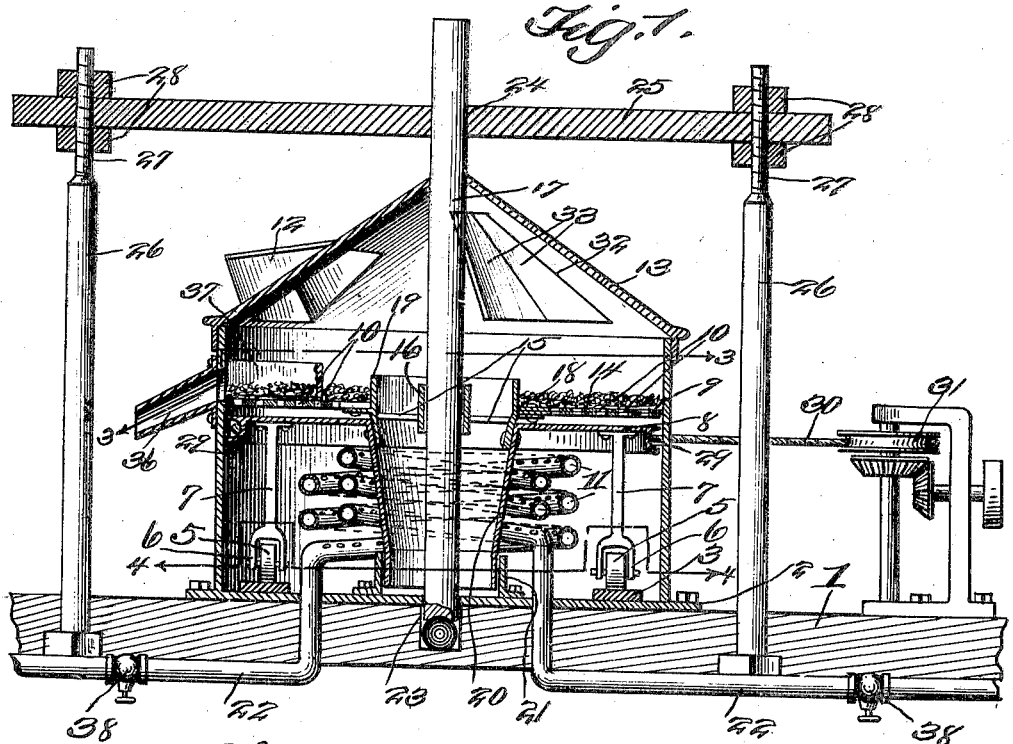
Witnesses
R. H. Boswell
A. L. Hough
Inventor
Wm. H. Noland,
By Franklin N. Hoyt
Attorney

W. H. NOLAND.
MACHINE FOR TREATING FRUIT.
APPLICATION FILED NOV. 1, 1909.

950,753.

Patented Mar. 1, 1910.
2 SHEETS—SHEET 2.

Witnesses
R. T. Craswell
A. T. Hough

Inventor
Wm. H. Noland,
By Franklin W. Hoyt,
Attorney

UNITED STATES PATENT OFFICE.

WILLIAM H. NOLAND, OF FRESNO, CALIFORNIA, ASSIGNOR OF ONE-THIRD TO E. A. STALLINGS AND ONE-THIRD TO T. B. HARDY, BOTH OF FRESNO COUNTY, CALIFORNIA.

MACHINE FOR TREATING FRUIT.

950,753. Specification of Letters Patent. Patented Mar. 1, 1910.

Application filed November 1, 1909. Serial No. 525,774.

*To all whom it may concern:*

Be it known that I, WILLIAM H. NOLAND, a citizen of the United States, residing at Fresno, in the county of Fresno and State of California, have invented certain new and useful Improvements in Machines for Treating Fruit; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention belongs to the art of fruit treating machines, and it more especially pertains to a machine by which the fruit, for instance, raisins and the like, may be treated by the employment of steam.

The primary object of the invention is the provision of a processing inclosure or tank having a hopper (through which the fruit is passed) and a discharge opening for the fruit, and provided upon the interior thereof with a revolving table or plate having perforations upon which the fruit is received, and after being treated by the steam, automatically discharged through the discharge opening.

Another object of the invention resides in providing the revolving table or plate having caster or antifrictional wheels which engage and rotate upon the bed-plate within the processing inclosure or tank.

Another object of the invention is to provide the revolving table or plate upon its periphery with an annular groove, about which a suitable cable travels for imparting a revolving action to the table.

A further object of the invention is the provision of a steam coil located below the revolving table or plate for treating the raisins or other fruit or similar articles deposited upon the table.

A further object of the invention is the provision of a deflector plate or fender, by which the fruit or raisins carried by the revolving table are automatically deflected through the discharge opening.

A further object of the invention is to construct the revolving table top in sections, each being perforated as shown, which sections may be rigidly or detachably carried by radial arms of the vertically arranged shaft, extending concentrically through the processing inclosure or tank.

A further object of the invention is the provision of a flange or fender of the revolving table top (which is composed of more than one layer or section) by which the condensation of steam is prevented from reaching the bearings of the vertically arranged shaft (which would have a tendency to injure the same).

In this specification and the drawings accompanying the same, a certain design of device is complied with, but the invention is not to be confined to this special form. The device in its actual reduction to practice may require changes and variations; the right thereto belongs to the applicant, provided such changes and variations are comprehended by the accompanying claims.

Further objects and combinations of various parts will be hereinafter more clearly set forth and pointed out in the appended claims.

Figure 4:
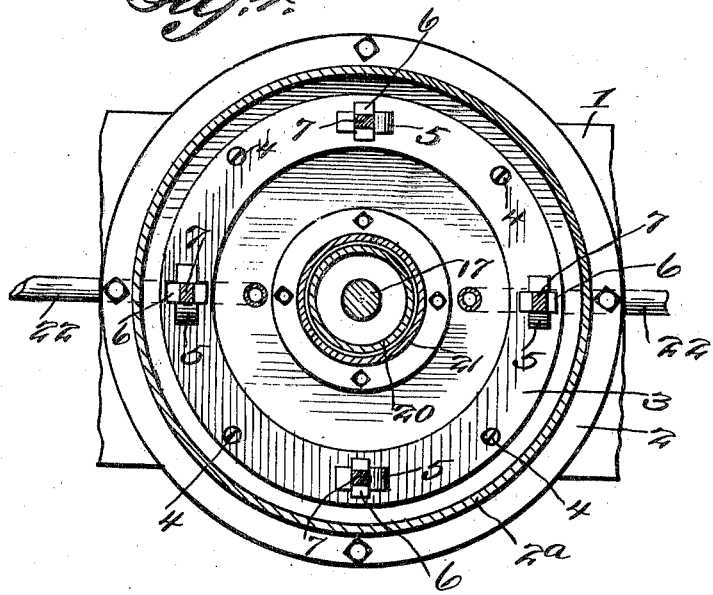

In the drawings:—Figure 1 is a vertical sectional view through the fruit treating machine or apparatus, showing some of the parts in elevation. Fig. 2 is a top plan view of the fruit treating machine or apparatus, showing the relative position of the hopper with regard to the discharge opening, and illustrating the means by which access may be had to the interior of the processing inclosure or tank. Fig. 3 is a horizontal sectional view upon line 3—3 of Fig. 1, showing the top or perforated portion of the revolving table or plate. Fig. 4 is a horizontal sectional view upon line 4—4 of Fig. 1, below the revolving table top or plate, showing the trackway upon which the frictional wheels or casters travel.

Referring to the drawings, 1 denotes the foundation or base upon which the bed-plate 2 is fixed. Resting upon the bed-plate 2 is an annular trackway 3, which is secured in position and to the bed-plate by means of suitable screws 4, and upon which the travelers, casters or antifrictional wheels 5 travel (which are journaled in bearings 6 of the legs or supports 7 of the revolving table or plate 8).

9 designates a table, made up preferably of two disks with registering perforations 10, mounted upon a flange of the shell 19 which rotates with the table 8 to which it is fastened a slight distance above the latter. The fruit which is passed through the hopper 12, fastened in an opening in the top 13 of the processing chamber 2ª, into the interior of the apparatus lodges upon said table and is acted upon by the steam issuing from the perforations of the coil and which passes through the perforations of the table. Each layer or annular plate may be composed of a plurality of sections 14, if desired, and provided with the perforations. These sections 14 of the revolving table top may be rigidly or detachably carried by radial arms 15 which project from a collar 16 mounted upon the vertically disposed shaft 17, in order that the table top may revolve with the shaft. This table top is provided with a central opening 18 about which an annular flange or fender 19 extends, to prevent the condensation of steam from contacting with or reaching the shaft.

Projecting centrally and downwardly from the under portion of the revolving table top is the extension 20, the lower portion of which is received within the annular flange or fender 21 of the bed-plate, and in such a manner as to prevent the condensation of steam from reaching the said shaft. The coil 11 surrounds the extension 20, and is disposed below the revolving table top, and extending to and leaving the coil are pipes 22, whereby the steam may be conveyed to and from the coil. The shaft 17 is mounted in bearings 23 and 24 of the foundation and the laterally propecting arm or beam 25 (which projects at right angles to the standard 26). This standard 26 extends upwardly from the foundation or base 1, and its upper portion is threaded, as shown at 27 (which penetrates the beam 25) and threaded thereon and above and below the beam 25 are nuts 28, whereby the beam 25 may be adjusted and held in its adjusted position.
The revolving table top or plate is provided with an annular grooved flange 29, about which the cable 30 engages, which cable travels about the pulley 31, to which any suitable power (not shown) may be applied, in order to impart a revolving action to the table.

The conical or dome-shaped cover or closure 13 is provided with a loose connection with the annular sides of the processing inclosure or tank, in order to allow the same to be removed, it being understood that this cover or closure may be permanently fixed or carried by the sides of the said inclosure or tank, if desired. The conical or dome-shaped cover is provided with a radially extending opening 32, through which access to the interior of the processing tank may be had. This opening 32 is closed by the slides 33, the upper ends of which are received by a segmental slot 34, by which the slides are guided when being moved. The lower portions of the slides are bent under the lower annular periphery of the cover or closure, as shown at 35, to further guide the slides when being moved. The processing inclosure or tank is provided with a fruit discharge opening 36.

The upper surface of the revolving table top is provided with a fender or deflector plate 37, which is disposed tangentially with regard to the center of the processing inclosure or tank, the purpose of which being to automatically deflect the fruit through the discharge opening, as the revolving table is in motion.

Steam from any suitable source (not shown) reaches the steam coil through one of the pipes 22, there being suitable valves 38 arranged in each one of the pipes 22 for the regulation of steam, and while the steam is passing through the coil or held therein, the fruit, which is deposited upon the revolving table, is properly treated. While the fruit is being deposited upon and discharged from the table, a slow revolving action is imparted to the table, in order to allow time for the fruit to be properly acted upon by the steam. The fruit is deposited upon the side 39 of the fender or deflector, and as the revolving table is in motion, the fruit reaches the opposite side 40 of the fender or deflector, and is automatically discharged thereby.

From the foregoing, the essential features, elements and the operation of the device, together with the simplicity thereof, will be clearly apparent.

It will be further noted, by the provision of a device of the above character, that this method of treating raisins or other fruit is cleaner and it leaves the raisins comparatively in their natural state.

Having thus fully set forth the invention, what is claimed as new and useful, is:—

1. An apparatus for treating fruit, comprising a receptacle having a discharge opening, a vertically rotatable shaft mounted within said receptacle, a collar fixed to said shaft, radial arms projecting from said collar, a cylindrical deflecting member fixed to said arms, a perforated table rotating with said shaft, a shell to which said deflecting member is fastened, said shell having a laterally extending portion with a grooved circumference, a driving means engaging said groove, arms projecting from said laterally projecting portion of the shell and caster wheels journaled in said arms, and a steam coil about said shell and beneath the table, as shown and described.

2. In an apparatus for treating fruit, an inclosure or tank having a hopper and a discharge opening and provided with an opening to allow access to the interior of the tank, slides for closing the last-named opening, a shaft extending vertically and centrally through the tank, a revolving table located within the tank having a perforated top provided with an annular groove, said revolving table having caster wheels, an annular trackway to be engaged by said wheels, a steam coil located below the top of the revolving table, said revolving table having flanges to prevent the condensation of steam from reaching the shaft, and a fender or deflector plate arranged tangentially with regard to the center of the tank for deflecting the fruit through the discharge opening.

In testimony whereof I hereunto affix my signature in the presence of two witnesses.

WILLIAM H. NOLAND.

Witnesses:
J. G. RHODES,
T. B. HARDY.